June 13, 1950     E. C. V. OLDOFREDI     2,510,999

MEANS FOR MOLDING AND DECORATING MATERIAL

Filed Oct. 19, 1945     4 Sheets-Sheet 1

INVENTOR:
Edgar C. V. Oldofredi
BY
his AGENT.

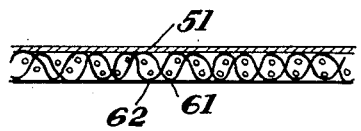
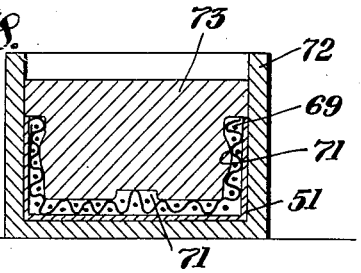
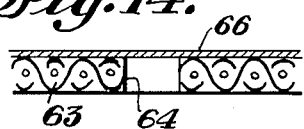
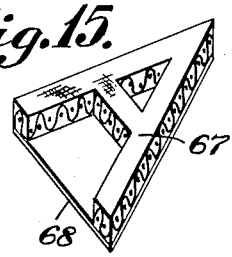
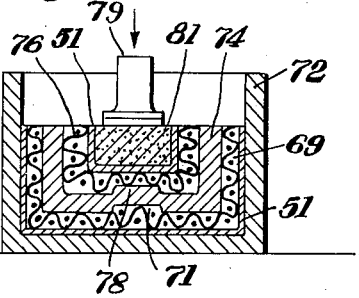
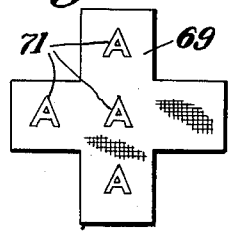
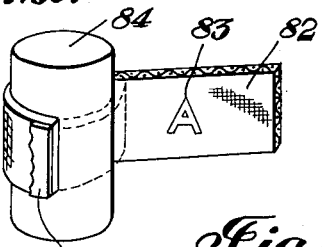
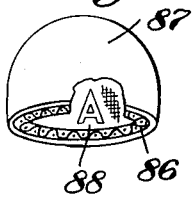
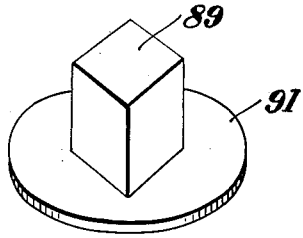
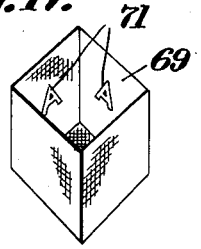

June 13, 1950   E. C. V. OLDOFREDI   2,510,999
MEANS FOR MOLDING AND DECORATING MATERIAL
Filed Oct. 19, 1945   4 Sheets-Sheet 3
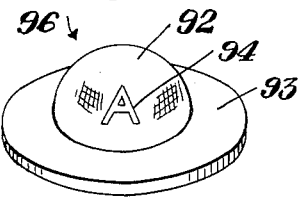
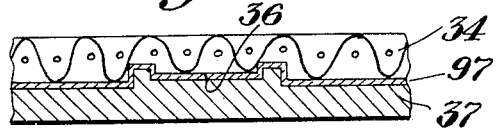
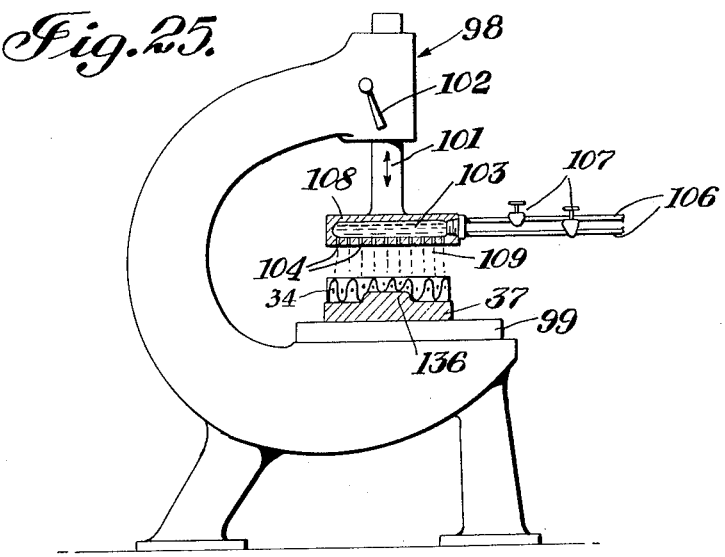
INVENTOR:
Edgar C. V. Oldofredi
BY
*his* AGENT.

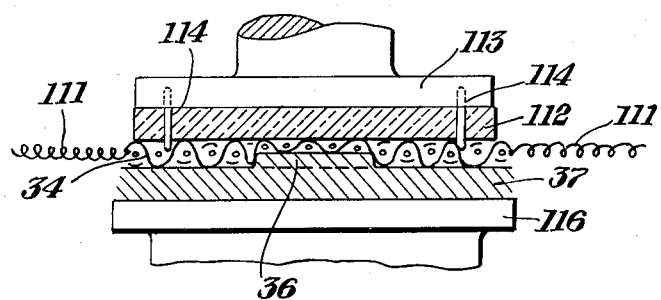
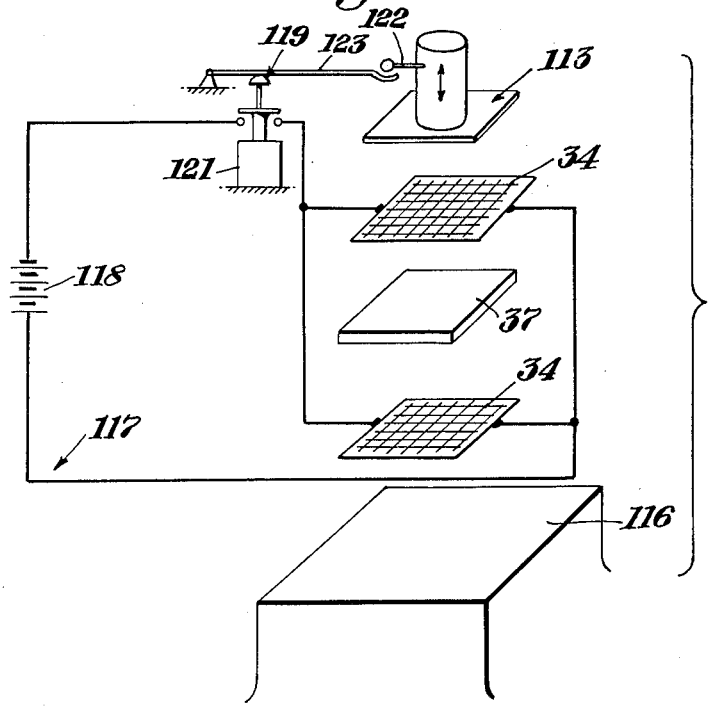

Patented June 13, 1950

2,510,999

UNITED STATES PATENT OFFICE 2,510,999

MEANS FOR MOLDING AND DECORATING MATERIAL

Edgar C. V. Oldofredi, New York, N. Y.

Application October 19, 1945, Serial No. 623,262

2 Claims. (Cl. 18—44)

This invention relates to means for producing decorated material and relates more particularly to means for molding and simultaneously decorating material and for decorating surfaces of moldable material.

This is a "continuation-in-part," reference being had to my pending application, Ser. No. 566,430, filed December 4, 1944.

One of the principal objects of my invention is to provide means for molding and simultaneously decorating material of three-dimensionally shaped surfaces.

Another object is to provide means for subjecting a surface of moldable material to a design impression by means of a formed wire mesh die.

Another object is to provide means for subjecting the surface of moldable material to impressions by a formed wire mesh die having embossed or recessed design areas.

Further objects and advantages of the invention will, in part, be set forth in the following specification and, in part, will be obvious therefrom without being specifically pointed out.

Designs may be imparted to the surfaces of moldable material in various ways some of which are outlined below. Material may be molded in a mold or form which contains a design on the inside of its walls either as a recess in the walls or projecting therefrom in form of a relievo. The material to be molded is filled into such a mold in a liquid or powdered state, and upon hardening, will have design reproductions embodied in its surface corresponding to the designs inherent in the wall of the mold.

Another way is first to impart to the material only a form during molding and thence to impart into the surface thereof designs after the material has been taken out of the mold but before it has assumed its final state of hardness.

Still another way consists in taking a molded material that has assumed its final state of hardness, and imparting to the surface thereof a design either by rendering the surface temporarily moldable again and letting it harden thereafter, or by impressing the design directly thereon if the consistency of the material is one of comparative softness and admits of such a direct impression, or furthermore, by imparting a design into the surface by carving it thereinto or otherwise removing material from the surface for the purpose of a design.

In the prior art methods and means of producing designs in moldable material have been made in accordance with one of the foregoing ways or by still other means. All of such designs, however, have heretofore required the work of a skilled artisan, whether for incorporating such a design into the walls of the mold for later reproduction, or for working it by hand directly into the moldable material after it has been shaped in a mold, or still further by utilizing matrices, dies or stamps carrying a design for reproducing the same into the surface of a moldable material. Therefore, most types of molds, forms, stamps and matrices embodying a design for reproducing the same into the surface of a moldable material are in the present art characterized by high initial cost. Even simple patterns and designs require the skill of an expert for making such a matrix and, as such designs are required to be beautiful, the services of artists or highly skilled and specialized craftsmen are employed for manufacturing satisfactory reproduction means. Die-sinking, hand-routing, engraving and carving, and other slow methods of hand-tooling are employed in the making of the conventional casts and molds.

It has always been difficult, therefore, to provide molds and dies for short runs, such as are required for individualized products, for seasonal, fashionable and advertising novelties and the like, because the cost was prohibitive in relation to the quantities involved.

Furthermore, where dies and stamps have been used for reproducing a design into a material after it has received its final shape in a molding operation, great pressure is required to produce a three-dimensional design from the conventional die into the surface of a moldable material; and the reason for such high pressure requirement may be found in the displacement resistance of excess material caused by the solid die surface when it is pressed into the form.

Due to the high cost of such matrices or dies, they are often employed with material that is moldable only by means of a secondary operation after it has been formed and has lost its moldable characteristics. For instance, glass heretofore had to be liquified before a design impression other than cutting or etching could be made into the surface thereof.

In order to correct the deficiencies encountered by the use of methods and means of the prior art, I have devised a new means the objects of which have been mentioned in the foregoing and which are explained below in detail, and their advantages over the existing art are pointed out later on.

In the present invention, a mesh or fabric is used either as a mold or in combination with a mold during the molding operation, or after molding, as a die for the purpose of reproducing a three-dimensional design. The mesh may be made of metal wires or of plastic threads or of threads of other material, or of non-metallic threads interwoven with metal wire.

For some purposes the fabric may be used as a decorating die without further preparation for making impressions into the surface of a moldable material with a simple fabric pattern or such other screen or pattern as the weaving of the mesh may have inherent. It is possible to have a special fabric woven for such purposes which will result in a distinctive mesh reproduction.

The mesh die, and particularly the type of mesh die made of threads of hard and resilient material, such as metal wire, or plastic, fibre, glass thread, or a combination thereof, may be subjected to the impression of a design by methods related further below, for providing a formed mesh die having a compacted, embossed, or otherwise embodied design area.

With such a formed mesh die reproduction of a three-dimensional design may be performed or molding may be carried out simultaneously therewith and results may be obtained at a low cost compared to the great expense resulting from the use of methods and means known to the prior art, and lettering, pictures and intricate patterns enhanced by a fancy watered silk (moiré) background can easily be reproduced into a moldable material.

Decorating with such a formed mesh die produces a three-dimensional design which is surrounded by a screen pattern, and in my preferred embodiments the design itself is shown to have a recessed screen background, the latter being lighter in appearance compared to the former.

The surface of a wire mesh die, especially one of a coarse mesh consists of a multitude of elevations equalling less than one-twentieth of the area of a corresponding full surface; therefore, when impressing a wire mesh die into a surface, only a fraction of the pressure is required, that a solid die would necessitate contacting simultaneously over its entire area. At the same time, reduced pressure requirement is also caused by the fact that the displaced excess material will lightly penetrate into the wire mesh when brought in pressure contact therewith. I have made provisions which are described hereinbelow to control this penetration according to the consistency of the respective material.

With the above and other objects of the invention in view, the invention consists in the novel construction, arrangement and combination of various devices, elements and parts, as set forth in the claims hereof, certain embodiments of the same being illustrated in the accompanying drawings and described in the specification.

In the accompanying drawings:

Fig. 1 is a sectional view of a mesh in its application as a die;

Fig. 2 discloses a design in perspective, the letter "A" having been selected for the purpose of illustration;

Figure 1:
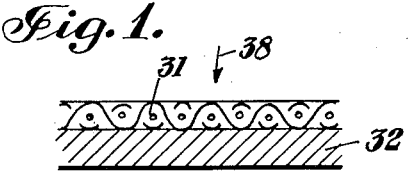
Figure 4:
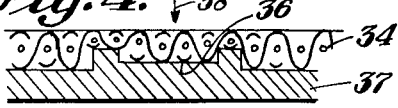
Fig. 4 is a cross section of a wire mesh having design impressions on its surface and a material engaged to the underside thereof.
Figure 7:
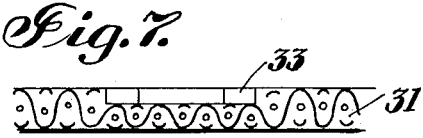
Fig. 7 is a sectional view of a mesh die with a design embedded therein.
Figure 8:
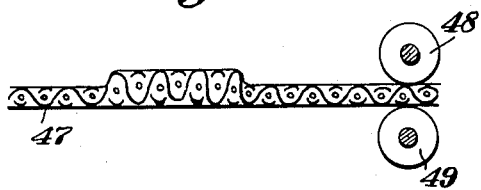
Figure 9:
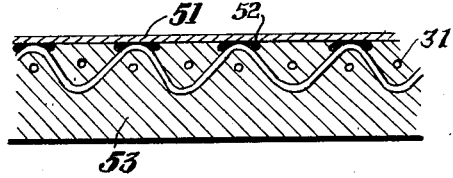
Figure 10:
Figure 11:
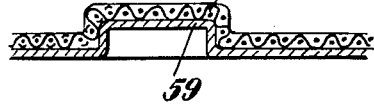
Figure 12:
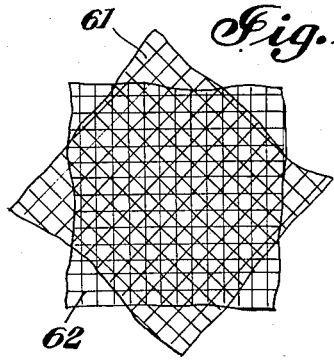

Fig. 8 discloses an embossed mesh die engaged by two flattening rollers;

Fig. 9 is a sectional view similar to Fig. 1, of a mesh die carrying a cover and shown in engagement with a material that has penetrated into the die;

Fig. 10 is a sectional view of a mesh die having a design elevation and carrying a cover on top;

Fig. 11 is a sectional view similar to Fig. 10, the cover being shown on the underside of the die;

Fig. 12 is a top view of two wire fabrics at an angle of weaving to each other and closely entwined;

Fig. 13 is a sectional view of two entwined fabrics, which are shown in Fig. 10, and a cover secured thereon;

Fig. 14 is a cross section through a wire mesh having an aperture and carrying a cover on top;

Fig. 15 is a perspective view of a design cut out of wire mesh, the letter "A" having been selected for the purpose of illustration, and a cover on the bottom thereof;

Fig. 16 is a plan view of a formed wire mesh substantially shaped like a cross;

Fig. 17 is a perspective view of a formed wire mesh die folded from the mesh shown in Fig. 7;

Fig. 18 is a sectional view of a mold containing a molded material and a wire mesh die having a cover;

Fig. 19 is a sectional view similar to Fig. 18, disclosing a mold containing two wire mesh dies in pressure engagement with material therebetween;

Fig. 20 is a perspective view of a cylinder and a mesh die enveloping the same in part;

Fig. 21 is a perspective view of a spherically shaped hollow wire mesh die with a cover on the outside;

Fig. 22 is a perspective view of a base and a cube thereon;

Fig. 23 is a perspective view of a base carrying a portion of a sphere;

Fig. 24 is a sectional view similar to Fig. 4, but showing a layer of paint between the wire mesh die and the material;

Fig. 25 is an elevational view partly in cross section, of a machine for utilizing the die for decorating;

Fig. 26 is a sectional view similar to Fig. 4, the wire mesh having electrical wire terminals, and an insulating plate is shown above the wire mesh; parts of a press are shown in elevation; and Fig. 27 is a schematic and partly extended view disclosing parts of a press and an electrical circuit connecting two wire mesh dies.

In accordance with my invention, the decorating of material is achieved by first embodying a design in a mesh or fabric and thereafter utilizing the mesh containing the design to impart the same to the surface of a material to be decorated.

In the description of the drawings in which similar numerals designate similar parts throughout:

Wire mesh die

Referring to Fig. 1, 31 indicates a wire mesh made of metal wire or of threads of other material, in contact with a moldable material 32 to be decorated. This type mesh will only be used as a die where the imparting of an ornamental pattern is desired, as the mesh die 31 was left unprocessed and only its inherent weaving pattern may be reproduced.

However, for decorating a material with a three-dimensional design, (embossing, debossing, etc., or a combination of coloring with embossing, etc.) a formed mesh die has to be used, made of metal wire or of threads of other hard and resilient material, which has been processed before being applied for reproduction: A design has to be worked or impressed into the mesh. This may be done by a multitude of methods, of which some are outlined below.

Impressing a design into the mesh may be accomplished in various ways according to the intricacy of the design involved and its dimensions. The following discloses a few of the numerous methods which I have found to be effective, and it is understood that similar results may be reached in many other ways without departing from the spirit of the present invention within the scope of the appended claims.

Designs consisting of plain outlines, signatures, etc., may be worked by hand directly into the mesh. This can be done by using carving tools, chisels, or by a power-driven router, and abrasive mounted wheel, or a rotary file.

Figure 2:
Figure 3:
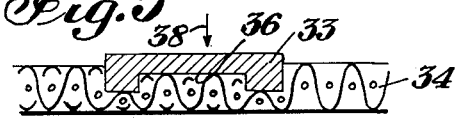
Fig. 3 is a sectional view of a mesh and a design in pressure engagement thereon.

Plain letters, signatures, simple trade-marks, etc., are cut out from plywood, cardboard, fibre or sheet metal, and those cut-out designs used as masters for a reproduction into the mesh (see Figs. 2 and 3). These masters are applied as a punch and are pressed into the fabric by any suitable means, such as a roller press apparatus, or the like. Thus, the design is reproduced into the mesh with all its details.

For the reproduction of ornaments even simpler means are available. Any suitable article of metal, such as a straight rule, a circle, square, etc., may be used as a master for pressing an ornament into a mesh or fabric.

It is possible to provide large size formed mesh dies at an amazingly low cost by repeatedly impressing the same master into the mesh. This is considered an important advantage of this process.

By preparing a set of letters, any combination of lettering may be composed and thereafter reproduced into the mesh. Such master alphabets may be used repeatedly, thus providing an inexpensive means of simple reproduction.

Another simple way of producing a formed mesh die consists in hand-composing the required copy or in providing a typecast master by machine typesetting. This master is then impressed into the mesh and the same composition may be used repeatedly for making any desired number of mesh dies or for impressing one fabric all over. Stock cuts, foundry borders, or machine borders, may be used in the same way.

Designs may be incorporated directly into a brass or copper mesh by applying photo-mechanical methods, following the usual procedure of related arts. Sensitizing the surface of a dense fabric and etching the same may be accomplished in the way a line-cut is photo-engraved, a method which is well known to those skilled in the art. The resulting etched mesh die will not show any compacted design area, but will show a design recess which is capable of reproducing the design.

When lettering only is required, the easy impressability of a mesh renders possible the use of a lettering device similar to an electric typewriter but with inverted letters. The flexibility of the fabric permits its insertion into the machine in the same way a sheet of paper is inserted into a typewriter. Instead of a rubber roll, a non-resilient fibre or metal carrier is necessary as a backing, and its length will have to be equivalent to the width of the mesh to be impressed. A holding fixture will facilitate the insertion of long sheets and the rolling up after processing.

In addition, any of the usual embossing methods may be used to impress a design into the mesh die and for imparting a design area therein.

While the above methods refer to special cases, it will be practical, for general purposes, to provide as master a zinc-etching which is prepared in the usual way. Light etching only is required and the cut does not have to be routed or blocked. This master is put face to face with the mesh and the whole subjected to pressure.

In Fig. 2, a design 33 is shown, the letter "A" having been selected for the purpose of illustration, which may be impressed as shown in Fig 3 into the surface of a wire mesh 34 by any suitable method as hereinabove described; the wire mesh 34 thereby receives a design impression 36. Only small pressure needs to be applied to cause such design impression 36; the pressure will be sufficient, however, to deform and flatten some of the weavings corresponding to the shape and outline and contour of the design 33. Said wire mesh 34 which has now become a formed wire mesh die is then placed in contact with a material 37 (see Fig. 4) for imparting thereon the shape of the design 33 while being subjected to pressure. The application of the pressure is indicated by a vertical arrow 38.

The design 33 may also be applied to both surfaces of a wire mesh which is thereby rendered usable for reproduction in obverse as well as reverse. For this purpose I impress the design 33 for about two-thirds of the thickness into the mesh; thereafter, I run the mesh through a pressure appliance, the impressed surface of said mesh being placed against a rubber plate as a counter, while the design 33 is being impressed into the opposite surface, thereby creating symmetrical design impressions in the mesh.

Figure 5:
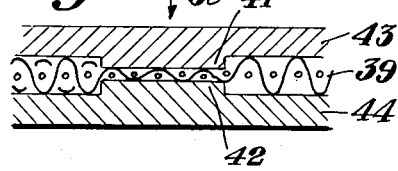
Fig. 5 is a sectional view of a mesh die between two materials to be decorated.

A mesh die 39 prepared by the foregoing procedure, the upper and lower surfaces having depressions symmetrical to and opposite each other designated 41 and 42, respectively, is shown in Fig. 5. A material 43 is placed on top of said die 39 and another material 44 is placed therebelow and both are shown in engagement therewith. Two materials 43 and 44 may be impressed simultaneously by using such a die 39 therebetween.

Figure 6:
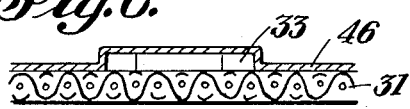
Fig. 6 is an elevational view, partly in section, of a mesh die, carrying a design and a cover coating thereon.

Instead of depressing the surface of a wire mesh or providing a recess therein as described in the above, the design 33 may also be placed on top of the wire mesh 31, as shown in Fig. 6, and may be connected thereto by means of sewing, soldering, or welding if it be of metal, or by any other suitable means. The design may also be sewn or embroidered directly thereon, using a thread of wire for that purpose. Such sewing or embroidering a design directly onto the surface of a wire mesh 31 may be done by hand or by a sewing or embroidering machine.

For making a wire mesh more resistant to wear and tear for frequent runs it may be coated on one of its surfaces with a suitable coating, preferably a metal coating by spraying metal thereonto. Such coating of metal or the like for the purpose of increasing the resistance to wear of the mesh should be done so that it only covers the wires of the mesh and leaves the spaces therebetween open. Such metal spraying should be done after the design has been embodied into the wire mesh and an example of such metal spray coating is shown in Fig. 6 and designated 46, and it will be readily understood that it may be applied to any other mesh dies described herein, for the purpose set forth. In Fig. 6, the metal spray coating is shown applied to the surface which includes the design 33, thereby rendering the design 33 as well as the wire mesh 31 more resistant.

The design 33 secured to the top of the wire mesh 31 as shown in Fig. 6 may, in a subsequent operation, be rolled into the wire mesh so that the design 33 will be substantially flush with the surface of the wire mesh 31, as disclosed in Fig. 7. A coating of metal spray may thereafter be applied to the surface common to the wire mesh and the design, or it may be used for reproducing without such coating.

In the ensuing decorating process the design 33 will leave an impression on the material which differs from the screen impression created by the surrounding mesh 31.

Another way of embodying a design in a wire mesh is by embossing it therein by any suitable embossing operation creating an embossed wire mesh die 47, shown in Fig. 8. The wire mesh die 47 may now readily be used for reproducing the design embossed thereon.

However, I prefer to subject the embossed wire mesh die 47 to a further operation by flattening the now raised design area into the mesh. This is easily done by pressing the mesh in a flat bed press or between two rollers 48 and 49, as shown in Fig. 8, and the design area is thus pressed down practically to the same surface level as the rest of the mesh.

I have discovered that a mesh die prepared by this sequence of operations has practically no compacted design area, but, at the same time, has a design area which differs in its structure of mesh from the surrounding area and which is suitable for reproduction onto a material. Said design area is characterized by a "weaving dislocation" brought about by the initial embossing operation, which subjected the respective portion of the structure of the mesh to a shifting, or dislocation and distortion.

Furthermore, the wire mesh may also be subjected to other processing. As shown in Fig. 9, a continuous cover 51 may be secured to a wire mesh 31. The cover may be made of thin sheet metal or other thin and pliable material if it is desired that the resulting article is flexible, or it may be made of heavy gauge metal if it is desired to lend rigidity to the entire device and may also consist of a continuous metal spray, as explained in detail later on. The cover 51 may be secured to one surface of the wire mesh 31 by means of soldering, brazing or welding, if it be made of metal, or it may be secured thereto by any other suitable means. In Fig. 9, welds are designated 52 and shown as connections between the wires of the mesh 31 and the cover 51.

Instead of using a plate for a cover the same may be substituted by a continuous coat of metal spray or the like, which, however, differs from the metal spray coating discussed hereinbefore. The continuous coating which takes the place of the cover plate will have an appearance very similar to the plate, inasmuch as it completely closes the openings between the wires on one surface of said wire mesh 31, and in Fig. 9 51 represents either a cover plate or a continuous metallized sprayed-on cover.

The rigidity of the entire device having such a continuous metal spray cover will vary with the thickness of such cover. If the metal spray is directed against the surface of the wire mesh 31 for a longer time the cover will become heavier and the entire device be more rigid.

The particular use of the embodiment shown in Fig. 9 will be discussed hereinbelow, a material 53 being shown in engagement therewith for the purpose of surface decorating.

A wire mesh may also receive impressions by one of the foregoing or other suitable and well known methods which will result in a design impression on one side and a corresponding elevation on the opposite side of said wire mesh. In Fig. 10, a wire mesh 54 is shown having such a "parallel design elevation" 56 and a cover 57 consisting either of a plate secured to a surface which contains the elevation 56 of said wire mesh 54, or consisting of a metal spray covering the entire upper surface area of said wire mesh 54. The elevation and corresponding impression do not have to be limited to one surface of the mesh, but a part of the design may appear on one surface, and a part on the other surface of the mesh.

A similar arrangement is disclosed in Fig. 11, the wire mesh 54 having a parallel elevation, and a cover 59 is shown secured to the underside thereof; said cover 59 consists of a plate or a continuous metal spray.

In Figs. 10 and 11, the covers 57 and 59, respectively, envelope one entire surface of the formed wire mesh die 54, following the contour thereof throughout. If such cover is made of a piece of metal or the like, it has to be either pliable so that it may easily be bent along the irregular surface of the wire mesh 54, or may have to be preformed in a separate stamping operation prior to securing it to the surface of the wire mesh.

An entirely different type of formed mesh die may be made by placing a wire mesh 61 on top of another wire mesh 62, at an angle of weaving, and subsequently pressing the same into each other until they are closely entwined (see Figs. 12 and 13).

A die of this character may thereafter be subjected to design impressions by one of the methods hereinabove described for incorporating a design, resulting in a formed die for reproducing an appealing watered silk (moiré) pattern and many novel patterns. The characteristics of this pattern change according to the angle of weaving of both fabrics.

If more than two fabrics are employed in this way, the resulting fancy pattern will be even more intricate and appealing in appearance.

An infinite number of patterns are made available by this method, because any two or more of the multitude of different standard meshes may be combined with each other.

If a formed mesh die is used as top mesh, its combination with such a plain mesh will result in a reproduction showing the design on an ornamental background of watered silk or other fancy pattern. An unlimited variety of such backgrounds being made available, the combination of a design, trade-mark or lettering with a unique background is afforded which offers an excellent means of individualization and identification.

For best results, it will be practical to use different grades of mesh for each layer and to provide as backing or bottom mesh a fabric made of a softer metal than the top wire mesh. In a three-layer-arrangement, for instance, the bottom may be copper wire mesh, the in-between-layer brass or aluminum fabric, and the top layer phosphorous bronze or Monel wire mesh. The compacting of such layer-arrangement of fabrics in different degrees of metal hardness may be done in any suitable manner by a separate operation, such as running it through pressure rollers. Thus, the layers will be pressed together according to the hardness of their basic metal and grade of mesh. A compacted sheet which can be easily handled is thus created.

A cover 51 may be secured to one surface of said entwined wire mesh combination die and secured thereto as discussed hereinabove and may preferably consist of a continuous metal spray which covers the entire surface area including the perforations thereof.

In addition to such continuous metal spray the other side of any one of the type of dies shown, may also be subjected to metal spraying: this latter spraying, however, must be confined to the wires of the mesh die and must not cover the perforations in the surface; it merely serves the purpose of increasing the resistance to wear of the die, as discussed at Fig. 6 in the foregoing.

In Fig. 14, a mesh die 63 is shown from which a portion has been cut out, leaving an aperture 64 in the mesh die 63. A cover 66 of metal plate or the like is shown on one surface thereof covering the same completely including the aperture 64 and is secured to the surface by soldering or any other suitable method. However, the cover 66 does not consist of a metal spray coating, but consists of a continuous piece of material. Metal spraying may not be employed for this cover 66 as the cover would show a discontinuation adjacent the aperture 64.

In Fig. 15, a design 67 in form of the letter "A" is shown cut out from a wire mesh and having a cover 68 secured thereto which is made of one piece of metal or the like. In this embodiment the wire mesh constitutes the design for reproduction in moldable material. The cover 68 envelops the entire surface of the design including the cut-outs thereof and has an outer contour which substantially coincides with that of the design 67.

I have found that my invention lends itself particularly well to decorate uneven surfaces, for instance, of cylindrical, convex or concave shape; as an illustration, five squares of a cube may simultaneously be decorated in one operation. For this purpose it is possible either to form a wire mesh first in cubic shape and thereafter to make the design impressions into the same, or, preferably, the design impressions may be made first and then the wire mesh formed into the required shape.

Accordingly, in Fig. 16, a flat wire mesh die 69 is shown having a plurality of design impressions 71 therein, and in Fig. 17 the mesh die is shown folded to a cubic shape with one open side. It may be held in this form either by soldering alongside the edges or by a frame, or by any other suitable means.

In Fig. 18, an application of the die shown in Fig. 17 is illustrated, having a design 71 embodied therein and having a cover 51 consisting of a plate or metal spray secured to the outside thereof, and the entire device placed in a mold 72; and a material 73 is shown in design engagement with the wire mesh 69. A detailed explanation of this figure is given later on. A further application of such a cubic die 69 is shown in Fig. 19, the die having the design impression 71 and the cover 51 secured to the outer surface thereof and placed in a mold 72 in engagement with a material 74. Said material 74 is at the same time engaged by a second mesh die 76 in contact with the inside of the material 74 and carrying a cover 51 secured to its inside and a design 78, embodied on its outside surface. A plunger 79 of a press is shown (other parts of the press having been left out), which is pressing against a medium 81 of sand or the like placed within the outline of said second mesh die 76 and designed to provide an even flow of pressure within the mold 72.

A flexible mesh die 82 is disclosed in Fig. 20 having a design 83 embodied on one surface and is shown applied against a material 84 of cylindrical shape. As shown in broken lines, the flexible die 82 may be completely wrapped around the cylindrical surface of the material 84 for the purpose of design reproduction thereon. Such a flexible die lends itself also to be wrapped around the surface of an entire column by applying it thereagainst in the manner of a cylindrical spring similar to the way a paper straw is constructed, but having the side edges abutting against each other rather than overlapping. The die may also be placed around steps, applied to unlevel, shaped, curved, or formed surfaces, as such a die is flexible and can be made in any length and shape and can have designs embodied over its entire length. Long surfaces of said wire mesh die may be decorated, successively, by repeating the same design, or one continuous design may be rolled thereinto or otherwise embodied therein. A cover, as shown in and described at Fig. 9, and designated 51 may again be secured to the outside of the wire mesh die 82, a portion of which is shown in Fig. 20, the rest having been broken away.

In Fig. 21, a spherically shaped, hollow wire mesh die 86 is shown having a cover 87 secured on the outside and having a design 88 embodied on the inside thereof; the front portion of the device shown in Fig. 21 is partly broken away to show the design 88 more clearly. The concave wire mesh 86 may be specifically woven to that shape and design impressions put therein afterwards, or it may be deep drawn or otherwise formed from a plane piece of wire mesh and the design embodied before or after such forming. The cover 87 must be preformed by a drawing operation if it be made of metal or the like, or may consist of a continuous layer of metal that has been sprayed onto the outer surface of the wire mesh 86.

A cube 89 formed integral with and protruding from a base 91 is shown in Fig. 22, made of moldable material and adapted to be subjected to a molding operation and/or a design imparting operation.

In Fig. 23, a finished article 96 of moldable material is disclosed; a semi-sphere 92 is shown which projects from a base 93 and has a design 94 embodied in the outer surface.

In addition to the three-dimensional design impression, a coat of paint, bronze emulsion or lacquer may be deposited on the surface of the moldable material, and in decorating of glass, an etching solution can similarly be applied. As shown in Fig. 24, a wire mesh die 34 embodying a design 36, has a layer of paint or other coloring material 97 thereon which is ready to be deposited therefrom onto a moldable material 37 shown in pressure engagement with said wire mesh 34.

In Fig. 25, a conventional hand-press 98 is shown comprising a frame, an operating table 99, and a plunger 101 which can reciprocate vertically in response to the movement of a hand lever 102 located in said frame. A pressure plate 103 is secured to the lower end of the plunger 101 and is made of insulating material. The inside of said pressure plate 103 contains a hollow chamber and perforations 104 in the base of said pressure plate 103 which connect the hollow chamber thereof with the outside. Pipe lines 106 are connected to one side of said pressure plate 103, each pipe having a valve 107 for controlling the flow therefrom. The other end of the pipe lines 106 connect to a cooling plant or heating plant, respectively, or to tanks containing chemical material; these connections are not shown in the drawing.

The hollow inside of the pressure plate 103 is shown filled with a liquid substance 108 which emanates from the pipe lines 106 and passes through the perforations 104 in form of a spray 109 shown below the base of the pressure plate.

A moldable material 37 is placed on top of said operating table 99 and carrying on top in close engagement a wire mesh 34 which embodies a design 136.

A wire mesh 34 embodying a design 36 is shown in Fig. 26, carrying an electric wire terminal 111 on each end; these terminals 111 provide connection to a source of electric charge adapted to send current into the wire mesh. Said wire mesh 34 is shown in contact with a moldable material 37 which is placed on an operating table 116 of a press (not shown in detail). Above said wire mesh 34, an insulating plate 112 is secured to the underside of a plunger 113 of the press and exerts pressure from above against said wire mesh. The wire mesh 34 and the insulating plate 112 are secured to the plunger 113 by means of straps 114 for providing a means to lift and lower the wire mesh together with the operating movement of the plunger 113.

An electric circuit 117 is illustrated in Fig. 27 which may be employed with the wire mesh 34 carrying electrical terminals 111 and shown in Fig. 26; the elements of Fig. 27 are shown in extended perspective in schematic. The electrical circuit 117 is activated by a source of electrical charge 118 and connects two wire mesh dies 34, arranged in parallel in the circuit, and includes a switch 119 in series with the electric source 118. A conventional timing device 121 is connected to the switch 119 for controlling the release thereof from its closed position and is adapted selectively to control the time in which current may flow through the electric circuit 117.

A plunger 113 and an operating table 116 are illustrated which form parts of a press (not shown) and a material 37 to be decorated is shown between the two wire mesh dies 34. The plunger 113 carries a lever 122 which bears upon an end of a second lever 123 during the downward movement of said plunger 113; said second lever 123 is stationary pivoted at the other end and rests about midway upon said switch 119.

When said plunger 113 moves downward, the lever 122 will bear against the one end of said second lever 123 which in turn will depress said switch 119 and close the electric circuit 117. During the upward movement of said plunger 113 the free end of said second lever 123 will be released and the switch may thereafter be lifted by the timing device after expiration of the selected period of time and will open the circuit 117 and return to its initial position; at the same time, the second lever 123 will then also resume its original place and is then ready for an ensuing operating cycle of the press.

*Molding and simultaneous decorating*

Molding and simultaneous decorating may be carried out with any one of the embodiments of my invention shown in the drawings and described in the foregoing.

A wire mesh is placed in a mold and may cover a portion of the inside thereof or may cover the entire surface area thereof. If the reproduction of a simple screen pattern is desired, a wire mesh 31 shown in Fig. 1 may be used. If the reproduction of a design is desired which has been embodied in a wire mesh, the mesh is placed in a mold with the design portion thereof facing the material, for imparting the design thereonto.

As an illustration and referring now particularly to Fig. 18, a wire mesh 69 having a design 71 embodied on its inner surface is placed in a mold 72 and covers the inside wall thereof for a portion, and is shown in contact with moldable material 73. A cover 51 is secured to the outer surface of said mesh die 69 which is adjacent the walls of said mold 72. When the material is filled into said mold in a liquid or semi-liquid state, or is injected in powdered form thereinto, the material will engage the design surface of said wire mesh 69 and receive design impressions in its own surfaces. The material may also penetrate into the body of the wire mesh 69 and fill the spaces between the wires thereof. In order to limit such penetration the cover 51 has been secured to the outside surface of the wire mesh 69. This is further illustrated in Fig. 9, where the combination of a wire mesh 31 with a cover 51 is shown in detail, wherein the cover may be a plate or may have been metal sprayed on.

When a wire mesh die is put in contact with the surface of a moldable material, a portion of said material may penetrate into the wire mesh depending on the pressure, the viscosity of the material and the type of wire mesh used. The moldable material 53 may only infiltrate, however, up to said cover 51 of the mesh die 31, but may not protrude beyond and will be retained therein. The cover 51 also will retain in the body of the mesh die any substances that may be placed therein, such as oil or a paste to prevent such infiltration altogether or to control the depth thereof.

After the material has been deposited in the mold 72, it undergoes a hardening process either by drying or by undergoing heat treatment which may be accomplished by heating the mold or by any other suitable means. Before the surface of the material has hardened completely, the same has to be removed from the mold together with the wire mesh 69, and the latter be lifted therefrom; thereafter, the material is left to harden by drying or is put into an oven for that purpose.

It will be understood that the particular wire mesh 69 shown in Fig. 18 and formed as shown and described at Fig. 17, may be substituted by any other of the wire meshes shown and described. For instance, material may first be poured into the mold to fill one half of its volume, and thereafter the wire mesh 39 shown in Fig. 5, having depressions in its upper and lower surfaces, be placed therein, and subsequently the mold filled with material up to the top. Two articles each having a decorated surface will result therefrom.

As a further illustration, the wire mesh 67 constituting a design, shown in Fig. 15, may be placed on the base of the mold 72 of Fig. 18 with the cover 68 downward, and then the material 73 is filled into the mold 72. Before the material is completely hardened the design 67 has to be removed from the surface thereof.

The arrangement shown in Fig. 19 admits of decorating a material of hollow shape from both outside as well as inside. After placing the lower die 69 into the mold, material is filled in, the quantity of said material depending on the volume of the final shape, and thereafter the upper die 76 having a design 78 embodied in its outside surface is pressed into the material designated 74. In order to facilitate such pressing, the inside of said upper die which carries a cover 51 has been filled with sand or similar material 81 for providing equal distribution in all directions. Pressure means represented in Fig. 19 by a plunger 79 are then applied against the surface of the sand 81 until the upper die 76 has reached its final position, shown herein (as an example) to be flush with the lower die.

To simplify the removing of the dies from the surfaces of the material 74, no designs have been shown in the sides of the dies but only in the upper and lower surfaces, respectively; however, design reproductions may well be made in the sides of the material if care is exercised in bending the die from the material when removing it therefrom. Molding may also be accomplished by providing semi-hard moldable material as shown in Fig. 22 with a projection from the base shown to be substantially in the form of a cube 89, but which may also be of any irregular shape even crudely formed by hand or otherwise. The specially shaped hollow wire mesh die 86 of the type shown in Fig. 21 having a cover 87 consisting of a plate or metal spray to provide additional rigidity and also to prevent material from penetrating beyond the thickness of the die, may thereafter be applied as a mesh die mold against said cubic projection 89. The die 86 will thereby impart to the projection 89 a convex shape 92 as shown in Fig. 23 and simultaneously leave a design impression 94 therein.

If hardening of a material is to be accomplished by heating, the die 69 and 76 may be heated by means of the electric circuit 117 as schematically illustrated and described at Fig. 27.

*Decorating moldable surfaces of previously formed material*

Materials such as ceramics or plaster are moldable for a certain period of time, after which, through drying, they gradually harden. Other moldable materials, on the other hand, like some plastic materials or clays, retain their moldable characteristics for a long period of time, some of them practically indefinitely. And finally, there are materials that are not moldable at all at room temperature, but become so only at elevated temperatures, such as thermoplastics, glass, etc.

It is possible, however, to make some materials of the first type temporarily moldable, at least on their surfaces, by treating them with a chemical agent, and it is possible to cause permanently moldable materials of the second group to lose these characteristics and to harden by heat treating some of them, or freezing certain others, or by chemically treating them in addition to this physical treatment.

In order to reproduce fine details of a design in the surface of a material, it is desirable to have the surface thereof in the proper moldable state at the moment of pressing the wire mesh die against the same.

In carrying the foregoing into effect and referring particularly to Fig. 25, I provide a press 98, described previously in detail, having a pressure plate 103 to which pipe lines 106 are connected. With this machine most types of material can be decorated in accordance with my invention; if a hard material is used and the surface has to be rendered moldable first, one of the pipes 106 will conduct the required chemical solution into the hollow chamber of the pressure plate 103 from where the same will flow downward through the perforations 104 and reach the surface of the material 34 in a thin spray 109 while the wire mesh 34 has been removed. The wire mesh 34 is thereafter placed on top of the material, and in the following operation, the plunger 101 is lowered and pressure is exerted from the pressure plate 39 against the wire mesh 37, and the surface of the material will assume the shape of the design 36, as shown in Fig. 4. After lifting the pressure and removing the wire mesh, another one of the pipes 106 may conduct a drying or other hardening agent for treating the material.

The treatments taking place before or after the pressure operation may be physical or chemical treatments, or a combination of the two, and may also be carried out while the wire mesh 34 is in place, except where the mesh die has a continuous cover secured to the upper surface, by spraying through the apertures of said wire mesh; these treatments may also be applied during the pressure operation.

If heating or cooling is required, steam, or hot or cold air, or gaseous carbon dioxide or the like may be blown through the pipes 106 resulting in an air flow instead of a spray. The physical and chemical treatments may also be carried out by any other suitable means, and I do not limit myself to the specific embodiments shown and described save as defined in the appended claims.

The wire mesh must be made of a material that is resistant to these physical or chemical treatments, and wire mesh made of steel, phosphorous bronze, nickel or Monel may be employed to withstand extreme heat and chemical reactions. The mesh die may also be treated for corrosion resistance by plating, coating, etc., or plastic threads may be employed for that purpose.

It will be readily understood from what has been said hereinabove, that anyone of the wire mesh dies disclosed and described in the foregoing may be utilized for this type of decorating.

For reproducing a design in a surface of cylindrical shape the flexible wire mesh die 82 may be used, shown in Fig. 20, which is wrapped around the cylindrical surface and in which successive portions of the die 82 are brought in contact with successive portions of the surface of said cylindrical material 84, and pressure is applied between said die and said cylindrical surface at each succeeding contact step.

Where high temperatures are required, for instance, to make the surface of glass temporarily moldable, and where it is advantageous to carry out the operation at the instance when the required temperature has been reached, I provide a conductive wire mesh that has electric current terminals 111, as shown in Fig. 26. These terminals connect to a source of electric charge and when a sufficient amount of current passes through the wire mesh, it will bring the same to the desired temperature. On top of the wire mesh I provide a flat piece of insulating material 112 to prevent the loss of heat through a plunger 113 when applied with relation to the wire mesh 34. The material 37 is then decorated as shown, and the design 36 will remain permanently in the surface after the material has cooled off.

The circuit for the electric current is illustrated in Fig. 27 where a material 37 is shown that may be decorated from above as well as below by means of two wire mesh dies 34. During the operation the switch 119 will be closed and cause electric current to flow through the wire mesh dies for heating the same.

Said switch 119 has a timing device 121 which will keep the circuit closed for a predetermined period of time which may be in excess of the time the plunger remains at its lowest position during the pressing operation. This is necessary where after the pressure stroke heating is required for the purpose of drying or the like. Said switch 119 may also be operated by hand for preheating prior to the pressure operation.

Besides the special applications suggested hereinabove, the formed wire mesh dies are usable with many of the well-known die-casting or molding machines, if the conventional casts or molds are replaced by molds equipped with my wire mesh dies of the types described hereinabove.

I do not limit myself to the particular details of construction set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described the invention, what I claim as new and desire to be secured by Letters Patent, is as follows:

1. An article for reproducing a design in a material, comprising a mesh and a continuous metallic spray on one surface thereof, for providing a cover thereon.

2. An article for reproducing a design in a material, comprising, two meshes at an angle of weaving to each other and closely entwined and providing at least one common surface, and a continuous cover disposed entirely on the exterior of and permanently secured to said surface.

EDGAR C. V. OLDOFREDI.

REFERENCES CITED

The following references are of record in the file of this patent:

UNITED STATES PATENTS

| Number | Name | Date |
|---|---|---|
| 199,583 | Siemens | Jan. 22, 1878 |
| 808,479 | Riddle | Dec. 26, 1905 |
| 1,978,030 | Ritchie | Oct. 23, 1934 |
| 2,016,913 | Uriwal | Oct. 8, 1935 |
| 2,076,846 | Johanson | Apr. 13, 1937 |
| 2,119,291 | Rieser | May 31, 1938 |
| 2,147,218 | Reimel | Feb. 14, 1939 |
| 2,320,789 | Montague et al. | June 1, 1943 |
| 2,370,186 | Oldofredi | Feb. 27, 1945 |